US012549635B2

(12) United States Patent
Huang et al.

(10) Patent No.: US 12,549,635 B2
(45) Date of Patent: Feb. 10, 2026

(54) SYSTEMS AND METHODS FOR EXPOSING USER EQUIPMENT IDENTITIES TO APPLICATIONS

(71) Applicant: Verizon Patent and Licensing Inc., Basking Ridge, NJ (US)

(72) Inventors: Ye Huang, San Ramon, CA (US); Gerardo S. Libunao, Manalapan, NJ (US); Raghuram Parvataneni, Edison, NJ (US); Ravi Sharma, Freehold, NJ (US); Kirk Campbell, Long Valley, NJ (US); Suzann Hua, Beverly Hills, CA (US); Alexander Fadeev, Summit, NJ (US); Miguel A. Carames, Long Valley, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 472 days.

(21) Appl. No.: 17/173,483

(22) Filed: Feb. 11, 2021

(65) Prior Publication Data
US 2022/0255996 A1   Aug. 11, 2022

(51) Int. Cl.
*G06F 15/16* (2006.01)
*H04L 51/224* (2022.01)
*H04L 67/141* (2022.01)
*H04W 4/14* (2009.01)

(52) U.S. Cl.
CPC .......... *H04L 67/141* (2013.01); *H04L 51/224* (2022.05); *H04W 4/14* (2013.01)

(58) Field of Classification Search
CPC ...... H04L 67/141; H04L 51/224; H04W 4/14; H04W 80/10; H04W 76/12; H04W 28/02
USPC ................................ 709/228, 227, 206, 217
See application file for complete search history.

(56) References Cited

U.S. PATENT DOCUMENTS

| 11,652,889 B2* | 5/2023 | Zhu | H04L 45/306 |
| | | | 709/227 |
| 2018/0192471 A1* | 7/2018 | Li | H04W 4/50 |
| 2019/0053117 A1* | 2/2019 | Bae | H04W 36/125 |
| 2019/0306913 A1* | 10/2019 | Kim | H04W 4/70 |
| 2020/0053554 A1* | 2/2020 | Kim | H04W 8/24 |
| 2020/0229024 A1* | 7/2020 | Yang | H04L 67/14 |
| 2020/0396767 A1* | 12/2020 | Talarico | H04W 74/0808 |
| 2021/0068172 A1* | 3/2021 | Jeong | H04W 76/12 |
| 2021/0076320 A1* | 3/2021 | Park | H04L 69/322 |
| 2021/0314840 A1* | 10/2021 | Ren | H04W 36/0033 |

(Continued)

OTHER PUBLICATIONS

Technical Specification: 5G; Procedures for the 5G System (5GS)(3GPP TS 23.502 version 15.7.0 Release 15); ETSI TS 123 502 V15.7.0 (Oct. 2019). 362 pages. Sections 5.2.8.2.5 and 5.2.8.3.

*Primary Examiner* — Kaylee J Huang

(57) ABSTRACT

A system comprises a Network Exposure Function (NEF) and a Session Management Function (SMF). The MF may be configured to: receive, from the NEF, a first request to subscribe to a notification service offered by the SMF; send a create session request to a User Plane Function (UPF); receive a first response from the UPF to the create session request, wherein the first response includes binding information that pertains to an association between a User Equipment device (UE) identifier (ID) and Internet Protocol (IP) addresses; and send, as part of the notification service, a message that includes the binding information to the NEF.

20 Claims, 16 Drawing Sheets

(56) References Cited

U.S. PATENT DOCUMENTS

| | | | | |
|---|---|---|---|---|
| 2022/0021642 A1* | 1/2022 | Wang | ................ | H04W 8/10 |
| 2022/0201534 A1* | 6/2022 | Wang | ................ | H04W 24/04 |
| 2022/0201593 A1* | 6/2022 | Baek | ................ | H04W 60/00 |
| 2022/0408303 A1* | 12/2022 | Zhou | ................ | H04W 12/06 |
| 2023/0074358 A1* | 3/2023 | Xiong | ................ | H04L 61/2564 |
| 2023/0106757 A1* | 4/2023 | Tang | ................ | H04W 40/34 |
| | | | | 370/252 |
| 2023/0345347 A1* | 10/2023 | Wang | ................ | H04W 40/246 |

* cited by examiner

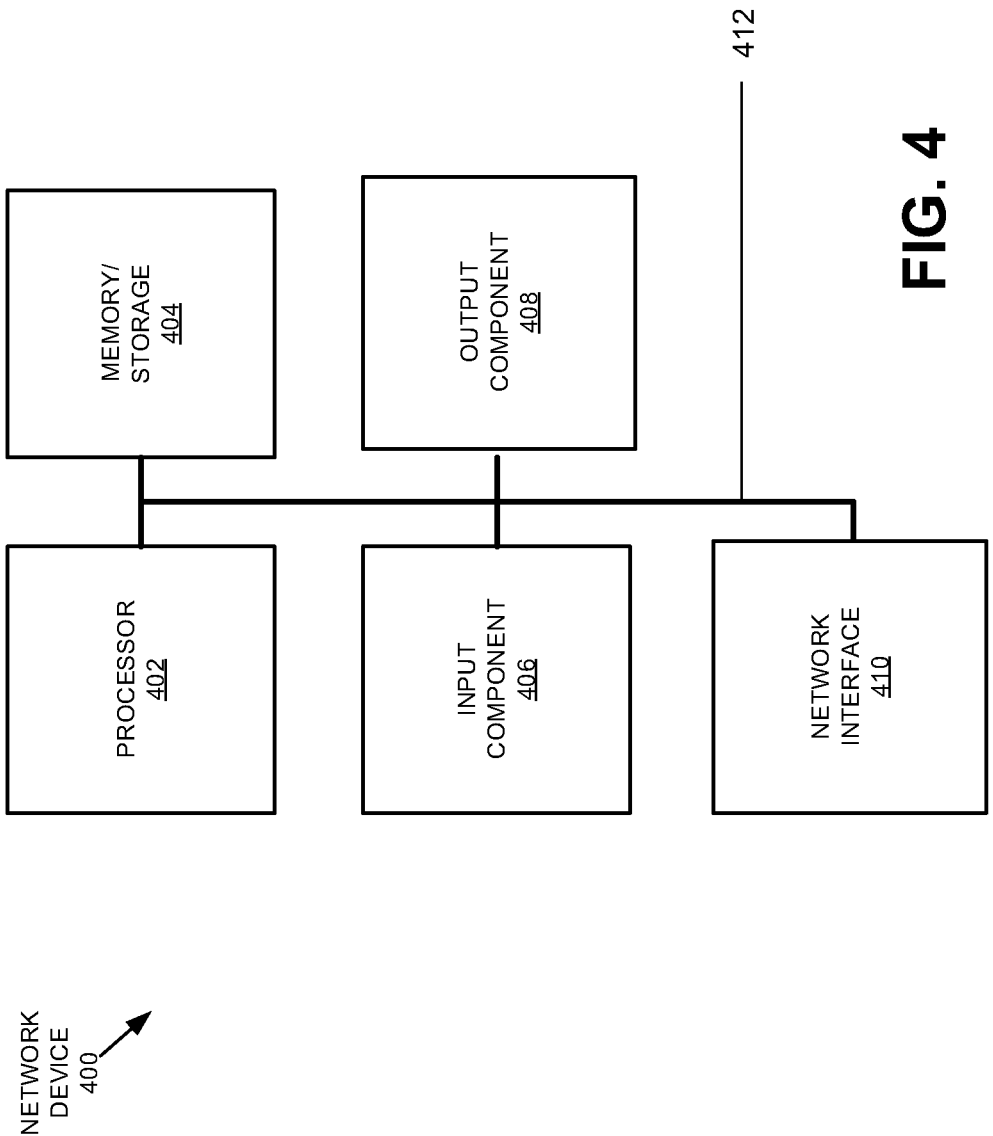

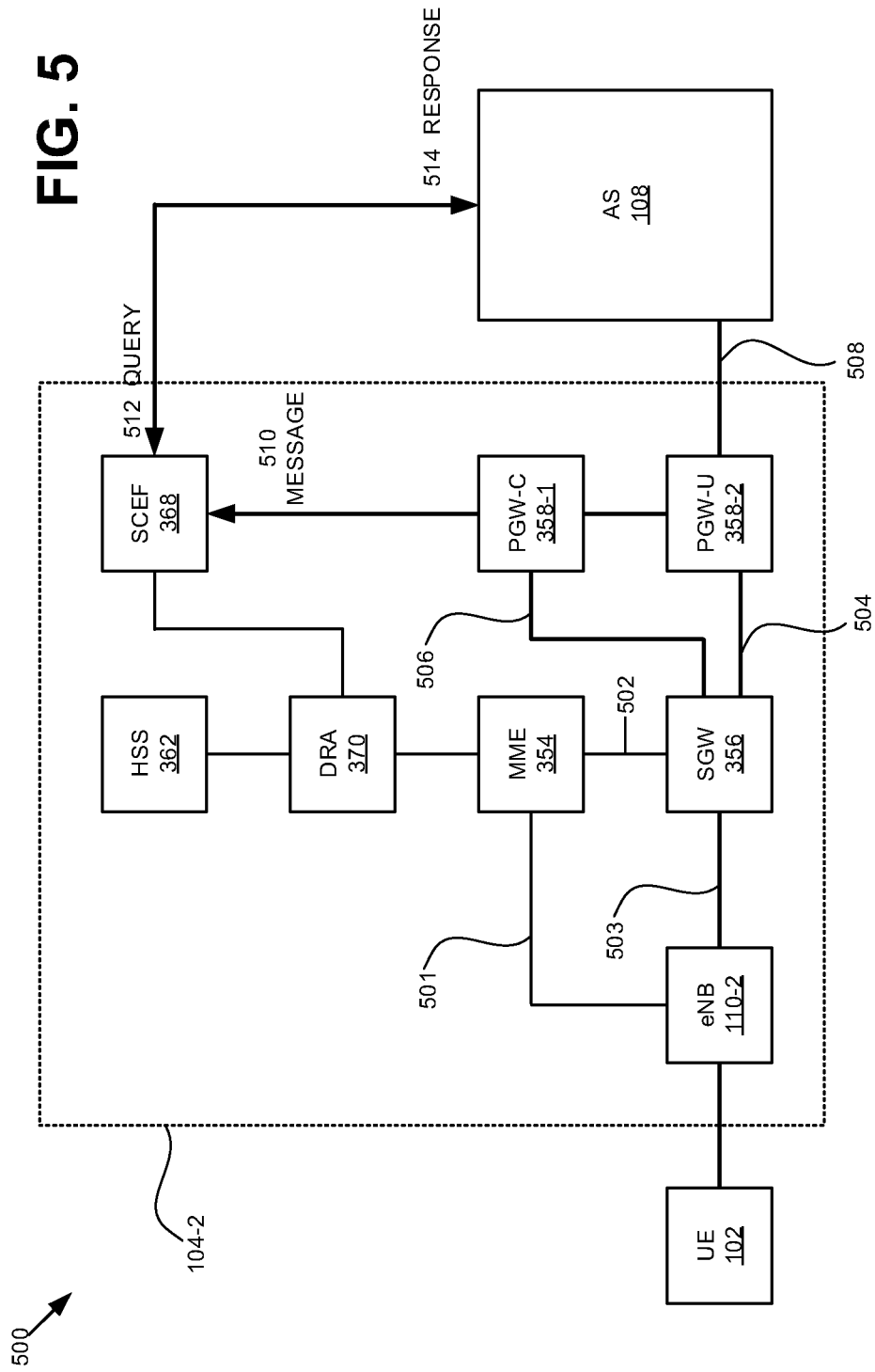

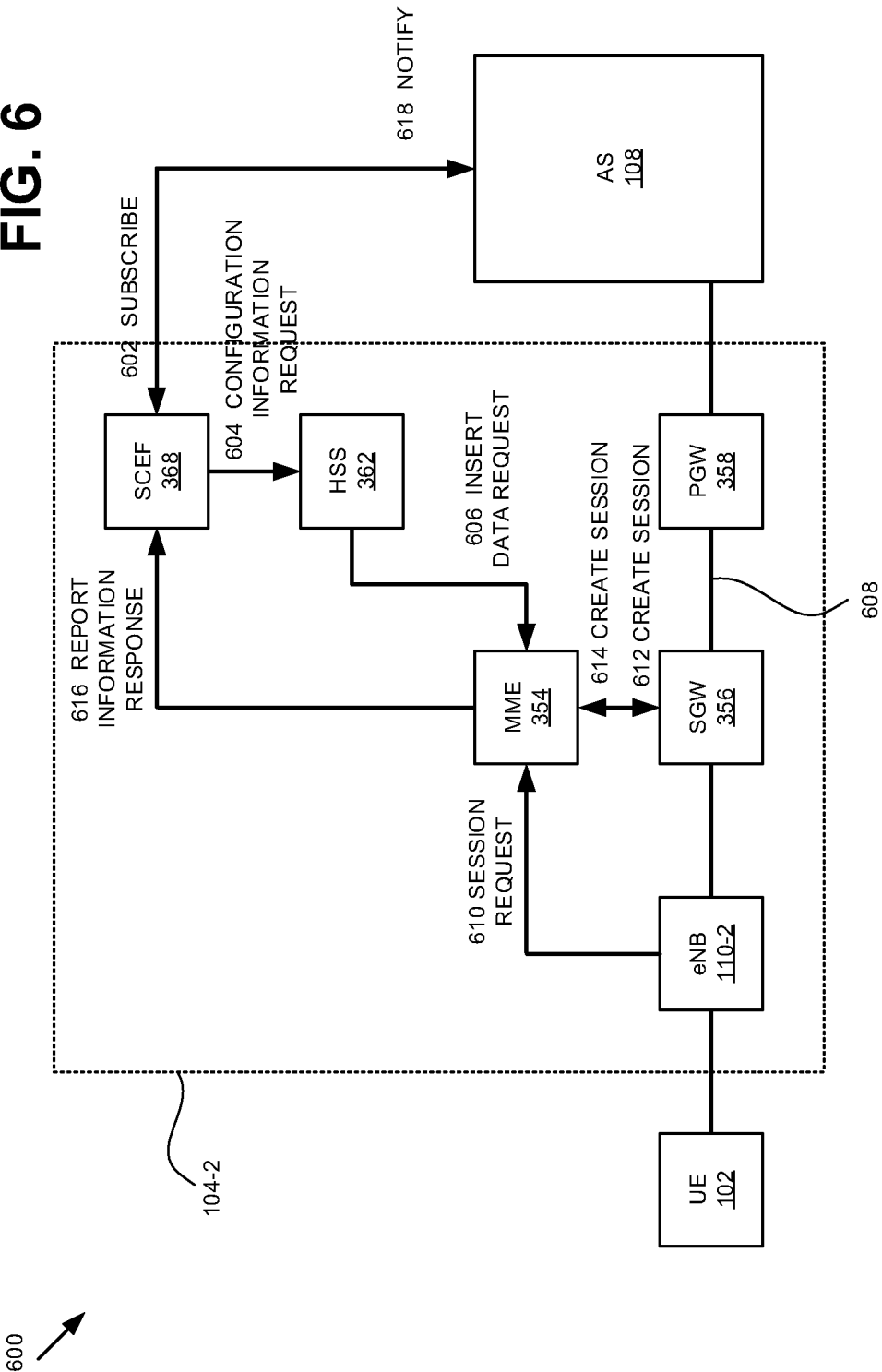

SYSTEMS AND METHODS FOR EXPOSING USER EQUIPMENT IDENTITIES TO APPLICATIONS

BACKGROUND INFORMATION

A network that belongs to a service provider may host applications, or alternatively, may serve as a conduit to such applications. That is, applications that provide streaming content, a Voice-over-IP (VoIP) service, and a Short Messaging Service (SMS), for example, may send their traffic to mobile devices over the provider network. For mobile devices to receive services from the applications, the provider network furnishes means for the mobile devices and the applications to establish communication sessions with one another.

BRIEF DESCRIPTION OF THE DRAWINGS

FIG. 4 depicts exemplary components of an exemplary network device;

FIGS. 5-8 show exemplary components of the system for exposing User Equipment device (UE) identities (IDs) according to different implementations;

DETAILED DESCRIPTION OF PREFERRED EMBODIMENTS

The following detailed description refers to the accompanying drawings. The same reference numbers in different drawings may identify the same or similar elements.

Figure 1A:
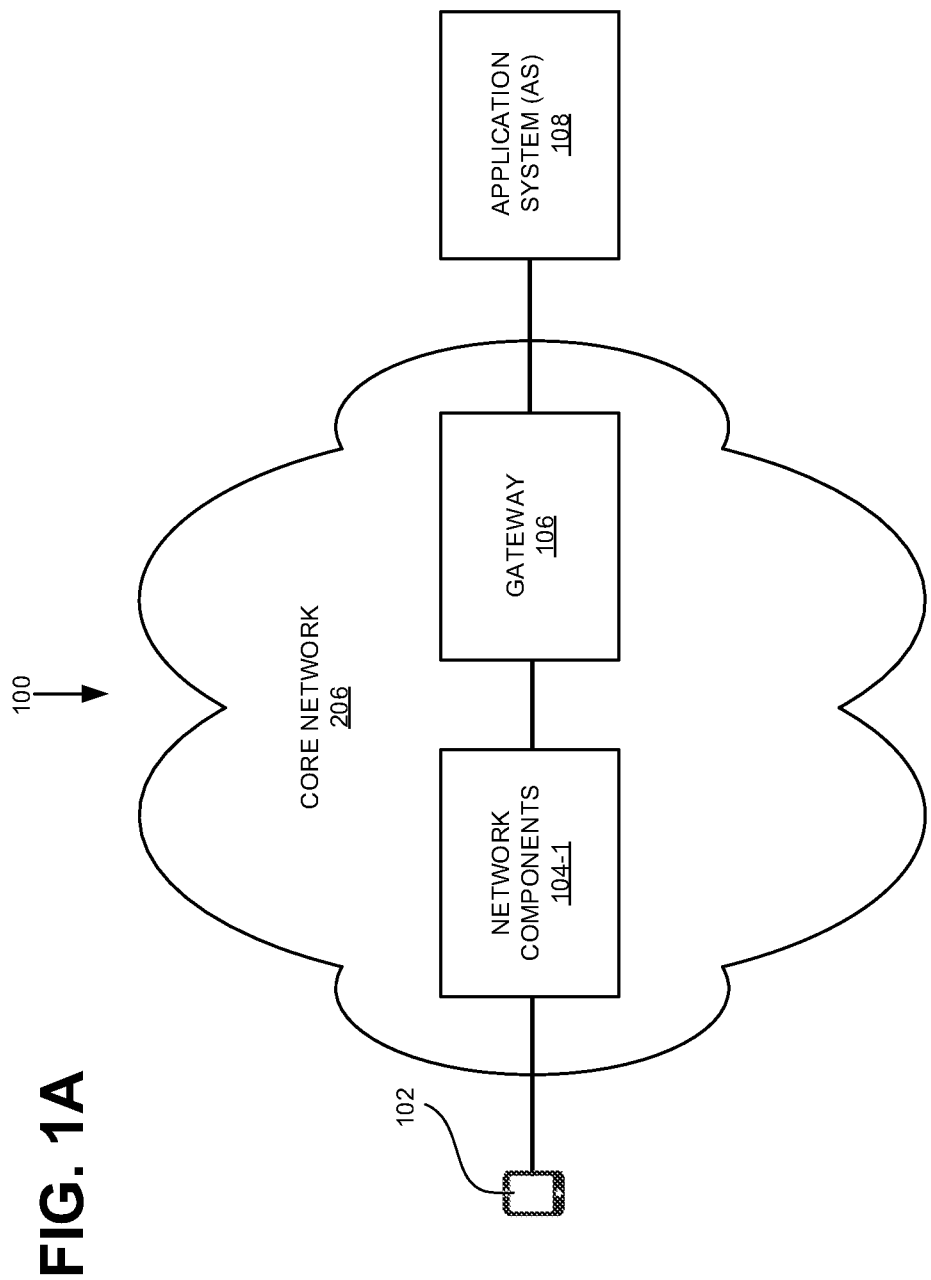
FIGS. 1A and 1B depict concepts described herein.
Figure 1B:
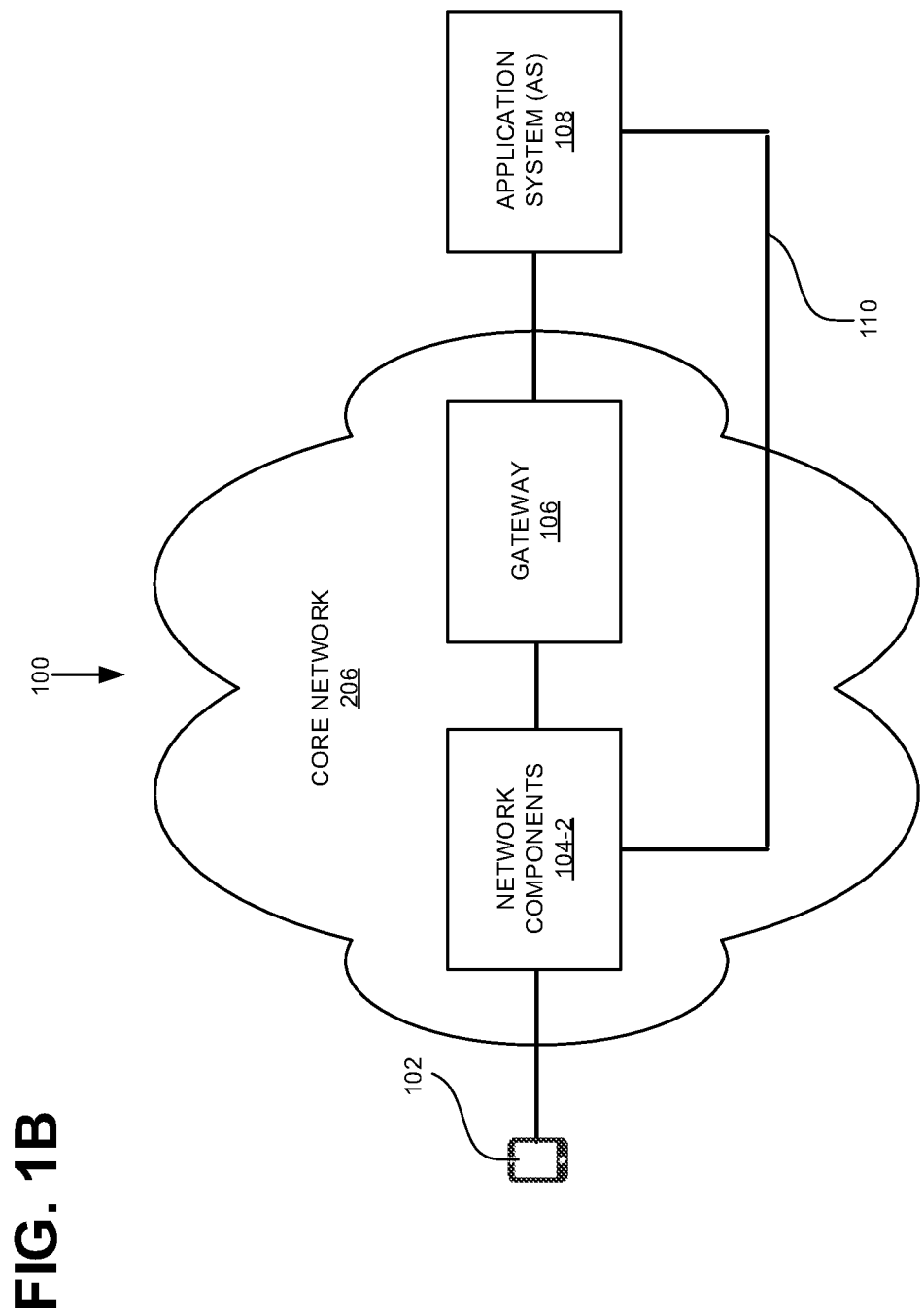

The systems and methods described herein relate to providing, to applications, the identities of User Equipment devices (UEs) that are wirelessly attached to a wireless network (e.g., a service provider network, a private network, etc.). The applications may or may not reside within the provider network. FIGS. 1A and 1B illustrate the concept. As shown, the concept involves a UE 102, a core network 206, and an application system (AS) 108. Core network 206 may further include some network components 104-1 and a component that operates as a gateway 106. These devices, network, and components are described in greater detail further below with reference to other figures.

Assume that UE 102 requests core network 206 to establish a session with AS 108, so that UE device 102 can receive services from AS 108, and that gateway 106 allocates an IP address from a pool of available IP addresses and assigns it to UE 102. Subsequently, network components 104-1 and gateway 106 can route packets from UE 102 to AS 108. For AS 108 to perform its service authorization and provide its service, AS 108 needs the identity of the UE 102. AS 108 can identify the UE 102, if AS 108 is provided with what is referred to herein as a binding map—a map between UE IP addresses and a UE device identifier. Obtaining a binding map can be challenging, however, as the IPv4 addresses of the UE-originated packets may have been Network Address Translated (NATTED) by one or more intervening network devices.

FIG. 1B illustrates a high-level concept for providing a binding map to AS 108. As shown, network components 104-2, which are modified versions of network components 104-1, replace network components 104-1. Network components 104-2 extract the binding information and provide the binding information to AS 108. With the necessary information at hand, AS 108 can then identify UE 102 and render its services to UE 102.

Figure 2:
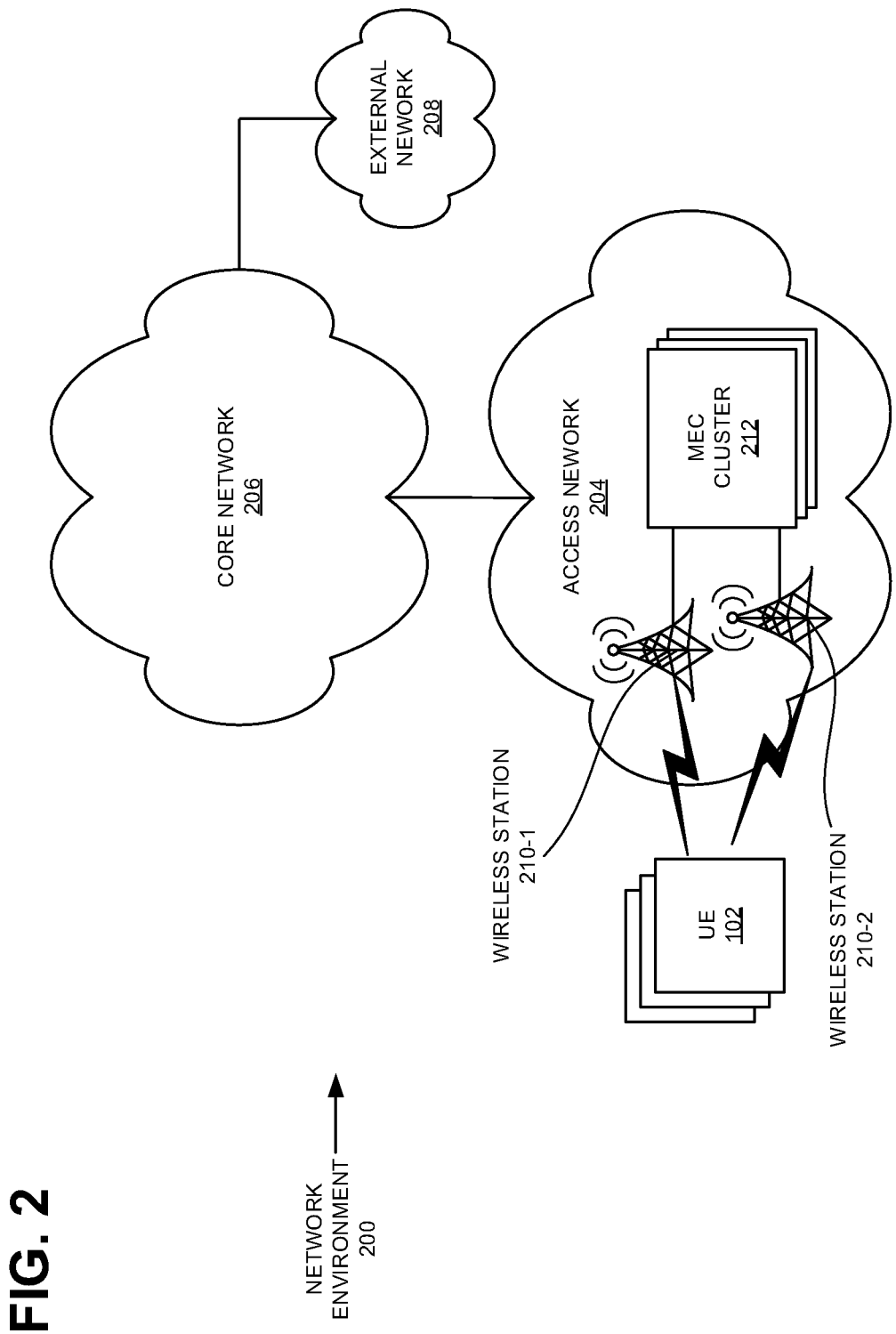
FIG. 2 illustrates an exemplary network environment in which the systems and methods described herein may be implemented.

FIG. 2 illustrates an exemplary network environment 200 in which the systems and methods described herein may be implemented. Network environment 200 may include one or more of UEs 102, access network 204, core network 206, and external network 208. UE 102 may include a wireless communication device. Examples of UE 102 include: a smart phone; a tablet device; a wearable computer device (e.g., a smart watch); a laptop computer; a portable gaming system; and an Internet-of-Thing (IoT) device, etc. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE device 102 may send packets over or to access network 204.

Access network 204 may allow UE 102 to access core network 206. To do so, access network 204 may establish and maintain, with participation from UE 102, an over-the-air channel with UE 102; and maintain backhaul channels with core network 206. Access network 204 may convey information through these channels, from UE device 102 to core network 206 and vice versa.

Access network 204 may include a Fourth Generation (4G) radio network, a Fifth Generation (5G) radio network and/or another advanced radio network. These radio networks may include many wireless stations, which are illustrated in FIG. 2 as wireless stations 210-1 and 210-2 (generically referred to as wireless station 210 and collectively as wireless stations 210) for establishing and maintaining an over-the-air channel with UE 102.

Wireless station 210 may include a 5G, 4G, or another type of wireless station (e.g., evolved Node B (eNB), next generation Node B (gNB), etc.) that includes one or more Radio Frequency (RF) transceivers. In some implementations, wireless station 210 (also referred to as base station 210) may be part of an evolved UMTS Terrestrial Network (eUTRAN).

As further shown, wireless stations 210 may be coupled to Multi-Access Edge Computing (MEC) clusters 212 in access network 204. MEC clusters 212 may be located geographically close to wireless stations 210, and therefore also be close to UEs 102 serviced by access network 204 via wireless station 210. Due to its proximity to UEs 102, MEC cluster 212 may be capable of providing services to UEs 102 with minimal latency. Depending on the implementations, MEC clusters 212 may provide many core functions at network edges. In other implementations, MEC clusters 212 may be positioned at other locations (e.g., in core network 206) at which MEC clusters 212 can provide computational resources for improved performance, but with little latency.

Core network 206 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks. Core network 206 may allow the delivery of communication services (e.g., Internet Protocol (IP) services) to UE 102, and may interface with other networks, such as external network 208. Depending on the implementation, core network 206 may include 4G core network components (e.g., a Serving Gateway (SGW), a Packet data network Gateway (PGW), a Mobility Management Entity (MME), etc.), 5G core network components, or another type of core network component.

External network 208 may include networks that are external to core network 206. In some implementations, external network 208 may include packet data networks, such as an IP network.

Figure 3A:
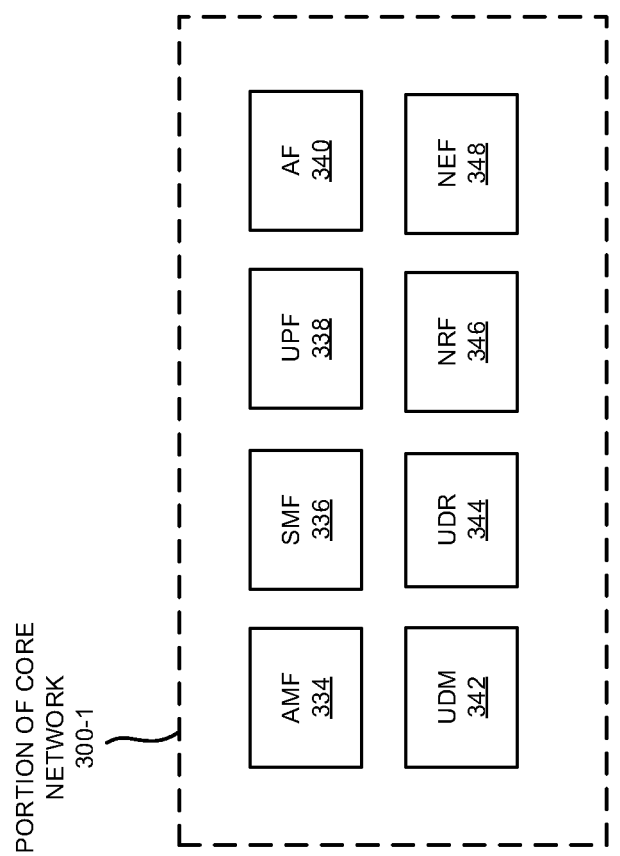
FIGS. 3A and 3B illustrate exemplary functional components in the core network of FIG. 2 according to different implementations.
Figure 3B:
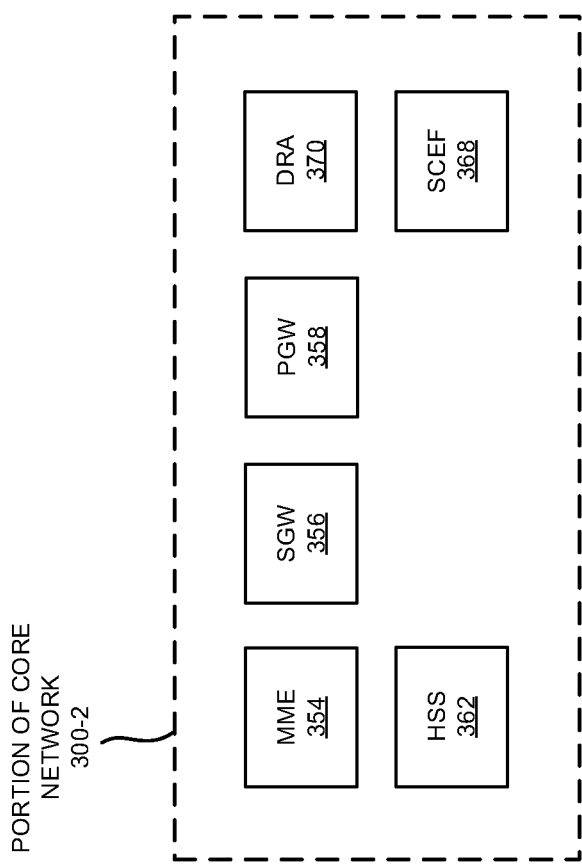

FIGS. 3A and 3B illustrate exemplary functional components of core network 206 of FIG. 2. In particular, FIG. 3A shows some of the core components when core network 206 is implemented as a 5G core network, and FIG. 3B shows some of the core components when core network 206 is implemented as a 4G core network. The core components in FIGS. 3A and 3B may co-exist within a single core network, as shown in later figures.

As shown in FIG. 3A, a 5G core network portion 300-1 may comprise a number of network function (NFs), which include: an Access and Mobility Function (AMF) 334, a Session Management Function (SMF) 336, a User Plane Function (UPF) 338, an Application Function (AF) 340, a User Data Management 342, a User Data Repository (UDR) 344, a Network Repository Function (NRF) 346, and a Network Exposure Function 348. Although 5G core network portion 300-1 may include additional components, they are not illustrated in FIG. 3A for simplicity.

AMF 334 may perform registration management, connection management, reachability management, mobility management, lawful intercepts, Short Message Service (SMS) transport for UE 102, session management messages transport between UE 102 and SMF 336, access authentication and authorization, and location services management. AMF 334 may provide the functionality to support non-3GPP access networks, and/or other types of processes.

SMF 336 may perform session establishment, session modification, and/or session release, perform Dynamic Host Configuration Protocol (DHCP) functions, perform selection and control of UPF 338, configure traffic steering at UPF 338 to guide the traffic to the correct destinations, terminate interfaces toward a Policy Control Function (PCF), perform lawful intercepts, charge data collection, support charging interfaces, control and coordinate charging data collection, terminate session management parts of Non-Access Stratum messages, perform downlink data notification, manage roaming functionality, and/or perform other types of control plane processes for managing user plane data.

UPF 338 may maintain an anchor point for intra/inter-Radio Access Technology (RAT) mobility, maintain an external Packet Data Unit (PDU) point of interconnect to a particular packet data network, perform packet routing and forwarding, perform the user plane part of policy rule enforcement, perform packet inspection, perform lawful intercept, perform traffic usage reporting, perform QoS handling in the user plane, perform uplink traffic verification, perform transport level packet marking, perform downlink packet buffering, forward an "end marker" to a RAN node (e.g., gNB), and/or perform other types of user plane processes.

AF 340 may provide services associated with a particular application, such as, for example, an application for influencing traffic routing, an application for accessing NEF 348, an application for interacting with a policy framework for policy control, a third-party application running on a server device in a particular packet data network, and/or other types of applications.

UDM 342 may maintain subscription information for UEs 102 at UDR 344, manage subscriptions, generate authentication credentials, handle user identification, perform access authorization based on subscription data, perform network function registration management, maintain service and/or session continuity by maintaining assignment of SMF 336 for ongoing sessions, support SMS delivery, support lawful intercept functionality, and/or perform other processes associated with managing user data. UDM 342 may store, in a subscription profile associated with a particular UE 102, a list of network slices which the particular UE 102 is allowed to access.

UDR 344 may store, retrieve, and update user subscription data, policy data, data related to exposure, and application data. UDR 344 may store/retrieve these data to other network functions. For example, the subscription data is made available to UDM 340 and other NFs in core network 206. The policy data may be available to a PCF. AF 340 may put or retrieve the application data at UDR 344, through NEF 348.

NRF 346 may support a service discovery function and maintain profiles of available NF instances and their supported services. An NF profile may include an NF instance identifier (ID), an NF type, a Public Land Mobile Network (PLMN) ID associated with the NF, network slice IDs associated with the NF, capacity information for the NF, service authorization information for the NF, supported services associated with the NF, endpoint information for each supported service associated with the NF, and/or other types of NF information. Additionally, NRF 346 may include one or more transport network Key Performance Indicators (KPIs) associated with the NF instance.

NEF 348 may expose services, capabilities, and/or events to other NFs, including third party NFs, AFs, edge computing NFs, and/or other types of NFs. Furthermore, NEF 348 may secure provisioning of information from external applications to core network 206, translate information between core network 206 and devices/networks external to core network 206, support a Packet Flow Description (PFD) function, and/or perform other types of network exposure functions. For example, an application server may use an API to request information identifying UE 102 from NEF 348 using an API.

Referring FIG. 3B, a 4G core network portion 300-2 may comprise a Mobility Management Entity (MME) 354, a Serving Gateway (SGW) 356, a Packet Data Network Gateway (PGW) 358, a Diameter Routing Agent (DRA) 370, a Home Subscriber Server (HSS) 362, and a Service Capability Exposure Function (SCEF)368. Functionalities of MME 354, SGW 356, PGW 358, HSS 362, and SCEF 368 are similar to those of AMF 334, SMF 336, UPF 338, UDM 342 and UDR 344, and NEF 348, and their description is omitted. DRA 370 provides a real-time routing of messages in 4G core network 300-2. Although 4G core network portion 300-2 may include additional components, they are not illustrated in FIG. 3B for simplicity.

FIGS. 2, 3A, and 3B do not show all components that may be included in network environment 200 (e.g., routers, bridges, wireless access point, additional networks, additional UEs 1-2, etc.), access network 204, core network 206, external network 208. That is, depending on the implementation, network environment 200, access network 204, core network 206, external network 208, core network portion 300-1, and core network portion 300-2 may include additional, fewer, different, or a different arrangement of components than those illustrated in FIGS. 2, 3A, and 3B.

In addition, the network components that have been described/defined with reference to FIGS. 2, 3A, and 3B may be included in the system of FIG. 1B, for exposing UE IDs to applications. For example, network components 104-2 of FIG. 1B may comprise some of core components 300-1 and/or 300-2. In another example, AS 108 may include a MEC cluster, AF 340, an application server, or another network component to support application services.

FIG. 4 depicts exemplary components of an exemplary network device 400. One or more of network device 400 correspond to, are included in, or provide a hardware platform for implementation of any of the network components of FIGS. 1, 2, 3A, and 3B, As shown, network device 400 includes a processor 402, memory/storage 404, input component 406, output component 408, network interface 410, and communication path 412. In different implementations, network device 400 may include additional, fewer, different, or a different arrangement of components than the ones illustrated in FIG. 4. For example, network device 400 may include a display, network card, etc.

Processor 402 may include a processor, a microprocessor, and/or another type of device for capable of controlling device 400 and/or executing programs/instructions. Memory/storage 404 may include static memory, such as read only memory (ROM), and/or dynamic memory, such as random-access memory (RAM), or onboard cache, for storing data and machine-readable instructions (e.g., programs, scripts, etc.).

Memory/storage 404 may also include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 404 may be external to and/or removable from network device 400. Memory/storage 404 may include, for example, a Universal Serial Bus (USB) memory stick, a dongle, a hard disk, off-line storage, a Blu-Ray® disk (BD), etc. Memory/storage 404 may also include devices that can function both as a RAM-like component or persistent storage, such as Intel® Optane memories.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 406 and output component 408 may provide input and output from/to a user to/from device 400. Input and output components 406 and 408 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to device 400.

Network interface 410 may include a transceiver (e.g., a transmitter and a receiver) for network device 400 to communicate with other devices and/or systems. For example, via network interface 410, network device 400 may communicate with wireless station 210. Network interface 410 may also include an Ethernet interface to a LAN, and/or an interface/connection for connecting device 400 to other devices (e.g., a Bluetooth interface). For example, network interface 410 may include a wireless modem for modulation and demodulation.

Communication path 412 may enable components of network device 400 to communicate with one another.

Network device 400 may perform the operations described herein in response to processor 402 executing software instructions stored in a non-transient computer-readable medium, such as memory/storage 404. The software instructions may be read into memory/storage 404 from another computer-readable medium or from another device via network interface 410. The software instructions stored in memory or storage (e.g., memory/storage 404, when executed by processor 202, may cause processor 402 to perform processes that are described herein.

FIG. 5 shows exemplary components of a system 500 for exposing UE IDs to applications according to one implementation. In this implementation, network components 104-2 (see FIG. 1B) includes MME 354, DRA 370, HSS 362, SCEF 368, and PGW 358, as described above in relation to FIG. 3B. PGW 358 is shown as including two parts PGW-C 358-1 and PGW-U 358-2, which correspond to a control plane part and a user plane part of PGW 358, respectively. Network components 104-2 further includes eNB 110-2, which is an LTE/4G implementation of wireless station 110. For simplicity, FIG. 5 does not show other elements that may be included in network components 104-2.

In FIG. 5, when UE 102 attaches to the network through eNB 110-2, eNB 110-2 coordinates with MME 354 to allow other components to complete a number of procedures, such as authenticating UE 102. MME 354 checks with HSS 362 via DRA 370, for example, to authenticate UE 102. Once UE 102 is attached to the network, UE 102 may send a session request through eNB 110-2 to MME 354 (signal 501). MME 354 then signals SGW 356, (signal 502). SGW 356 may coordinate with eNB 110-2, MME 354, PGW-C 358-1 and PGW-U 358-2 (signal 506), to establish and manage a data plane tunnel between PGW-U 358-2 and SGW 356 (tunnel 504), and to have PGW-U 358-2 set up a connection to AS 108 (connection 508). During this process, PGW-C 358-1 allocates an IP address and a corresponding Network Address Translated (NAT) IP address for UE 102. PGW-C 358-1 then forwards a message to SCEF 368 (message 510), to inform SCEF 368 about the allocated UE IP address, the NAT IP address for UE 102, and UE identity.

In one implementation, the message 510 comprises: an IP address (IPv4 or IPv6); Mobile Station International Subscriber Directory Number (MSISDN); International Mobile Subscriber Identity (IMSI); allocated Network Address Translated (NAT) IPv4 address; serving network identifier; Foreign agent IP address; RAT Type; External Identifier (ID); Data Network Access Identifier (DNAI); etc. SCEF 368 may store the information upon receipt of the message

510, as part of its binding map that includes associations between IP addresses and UE identities (e.g., IMSI/MSISDN).

When AS 108 needs the identity of the UE 102 to which the IP address has been assigned by PGW-C 358-1, AS 108 can query SCEF 368 (query 512) for binding information between UE ID and UE IPs. In one implementation, a query 512 from AS 108 to SCEF 368 for binding information may include: IP type (e.g., IPv4 or IPv6); a port number of IPv4; etc. When SCEF 368 receives the query 512, SCEF 368 may search the binding map using the IP address (and/or the port number) as a key. Upon finding the IMSI and/or MSISDN corresponding to the IP address in the map, SCEF 368 may forward the IMSI and/or MSISDN in its response to AS 108 (response 514).

FIG. 6 shows exemplary components of a system 500 for exposing UE IDs to applications according to another implementation. In contrast to FIG. 5, network components 104-2 in FIG. 6 do not show DRA 370 as part of the path between MME 354 and HSS 362. Assume that UE 102 has attached to the network in accordance with the procedure described above for FIG. 5.

In FIG. 6, the process for exposing the UE identity may include AS 108 sending a request to subscribe to a notification service offered by SCEF 368 (subscribe signal 602). The subscription request may convey a UE group identifier, filters, a connectivity status, and a packet data network (PDN) connectivity status. SCEF 368 pushes a configuration information request (CIR) to HSS 362 in response to the subscription (signal 604). The CIR may include the UE group ID, filters, and PDN connectivity status. HSS 362 then sends an Insert Data Request (IDR), along with the same UE group ID, filters, and PDN connectivity status (signal 606). As a result of receiving the IDR from HSS 362, MME 354 is configured to forward information about new or modified connections that involve SGW 356 and PGW 358. Thus, if SGW 356 and PGW 358 establish a connection to AS 108, MME 354 would notify SCEF 368.

An establishment of such a connection may occur when UE 102 sends a session request 610 to MME 354, via eNB 110-2 (signal 610). MME 354 selects SGW 356 and instructs SGW 356 to create a session (signal 612). Consequently, SGW 356 sets a tunnel 608 between itself and PGW 358 and instructs to PGW 358 create a connection to AS 108, providing any information relating to the packet data network to which the connection is to be made (PDN information).

During this process, PGW 358 allocates an IP address for UE 102 from its pool of free IP addresses and notifies SGW 356 of the IP address and a corresponding Network Addressed Translated (NAT) IP address. SGW 356 then prepares a create session response 614 that includes the IP address, the NAT IP address, and any other information. SGW 356 forwards the response 614 to MME 354.

Because MME 354 has received the IDR 606 earlier, MME 354 is configured to forward UE IP addresses and UE identity to SCEF 368. Therefore, when MME 354 receives the create session response 614 from SGW 356, MME 354 prepares a report information response (RIR) 616 that includes UE IPv4 address, the NAT IPv4 address, and other information (e.g., RAT type, location information, PGW-related information, port chunk start, port chunk size, etc.). MME 354 then sends the RIR 616 to SCEF 368. Because AS 108 is subscribed to SCEF 368's notification service (see the subscription message 602), SCEF 368 generates a notification 618 when SCEF receives the RIR 616 and sends the notification 618 to AS 108. In one implementation, the notification 618 may comprise a T8 message that includes the UE IP address, NAT IP address, UE ID, and/or other information (e.g., MSISDN, IMSI, External ID, DNAI, etc.).

Figure 7:
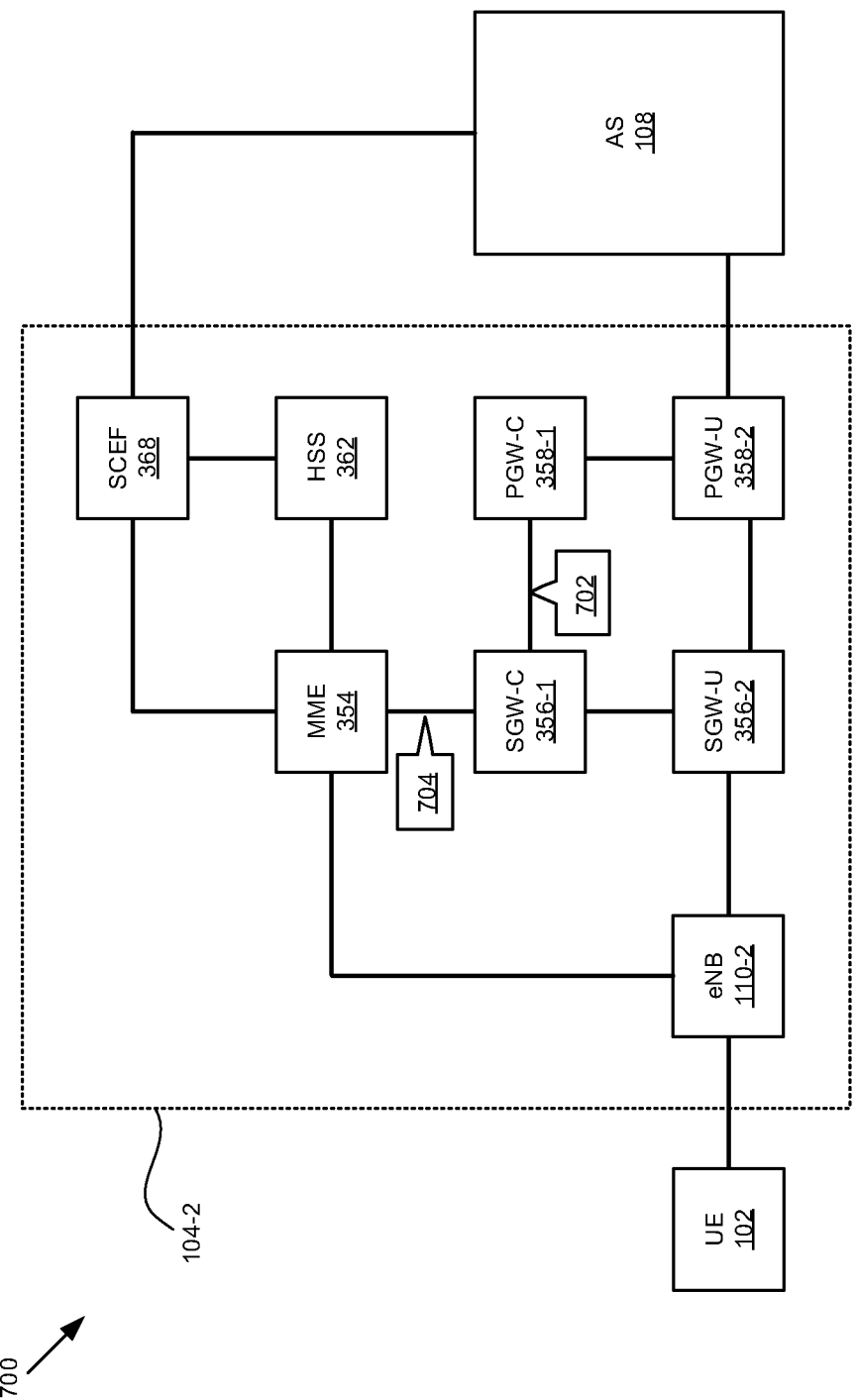

FIG. 7 shows exemplary components of a system 700 for exposing UE identity according to yet another implementation. In FIG. 7, SGW-Control plane (SGW-C) 356-1, SGW-User plane (SGW-U) 356-2, PGW-C 358-1, and PGW-U 358-2 replace SGW 356 and PGW 358 of FIG. 6. As configured, SGW-C 356-1 is coupled to SGW-U 356-2 and PGW-C 358-1 is coupled to PGW-U 358-2; SGW-C 356-1 interfaces with PGW-C 358-1 and SGW-U 356-2 interfaces with PGW-U 358-2; and SGW-C 356-1 interfaces with MME 354 (rather than SGW 356 interfacing with MME 354 as in FIG. 6) and PGW-C 358-1 interfaces with SGW-C 356-1 (rather than PGW 358 to interfacing with SGW 356 as in FIG. 6). SGW-C 356-1 implements a modified interface for responding to MME 354's create session request; and PGW-U 358-2 implements a modified interface for responding to PWG-C 358-1's create session request. In some implementations, PGW-C 358-1 and PGW-U 358-2 may be replaced by SMF 336 and UPF 338, respectively.

In terms of signaling, SGW-C 356-1 and SGW-U 356-2 perform the functions of SGW 356 in FIG. 6; and PGW-C 358-1 and PGW-U 358-2 perform the functions of PGW 358. Other components shown in FIG. 7 behave similarly as those of FIG. 6.

In contrast to embodiment depicted in FIG. 6, instead of MME 354 issuing a create session request to SGW 356, MME 354 issues the request to SGW-C 356-1, which then issues corresponding requests to SGW-U 356-2 and PGW-C 358-1. PGW-C 358-1 then transmits a create session request to PGW-U 358-2, which creates a session. The session creation entails establishing a tunnel between SGW-U 356-2 and PGW-U 358-2 and another one between PGW-U 358-2 and AS 108. After the session establishment, PGW-U 358-2 provides a response 702 to PGW-C 358-1 using the modified create session response interface. When PGW-U 358-2 conveys the information to PGW-C 358-1, PGW-C 358-1 forwards the information to SGW-C 356-1. SGW-C 356-1 uses its own modified create session response interface to provide a response 704 to MME 354's request to create the session.

In the preceding, the modified create session responses 702 and 704, from SGW-U 356-2 and PGW-C 358-1, both carry at least the following information: IPv6 address, NAT IPv4 address, a starting port chunk and a port chunk range, location, a serving gateway information that includes a fully qualified domain name (FQDN) and a common language location identifier (CLLI).

Figure 8:
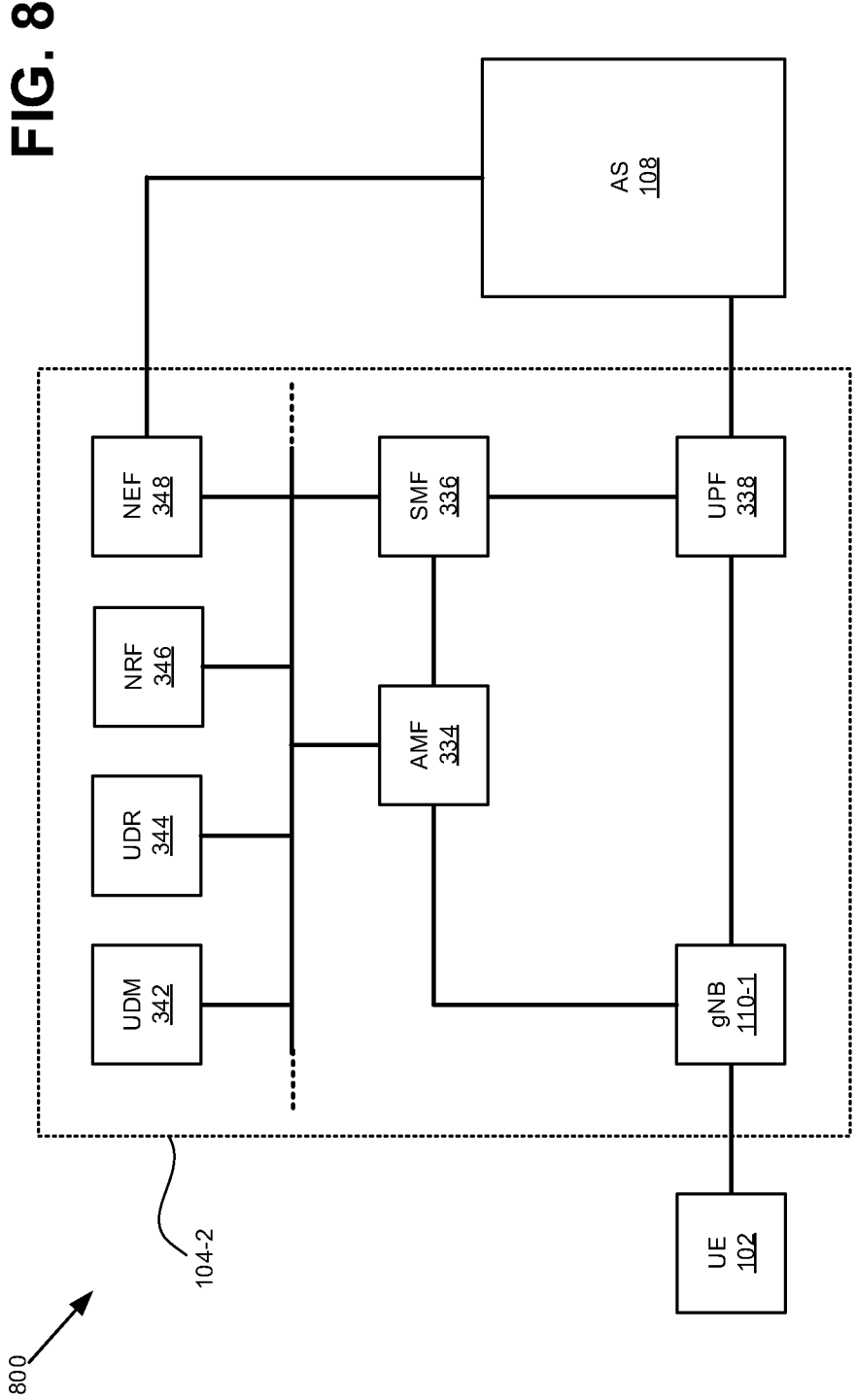

FIG. 8 shows exemplary components of a system 800 for exposing UE identity to applications according to yet another implementation. In FIG. 8, gNB 110-1 (which is 5G implementation of wireless station 110-1), AMF 334, SMF 336, and UPF 338, and NEF 348 take the place of eNB 110-2, MME 354, SGW 356, PGW 358, and SCEF 368, respectively, of FIG. 6. Further, UDM 342 and UDR 344 collectively replace HSS 362 of FIG. 6. The signaling between the components illustrated in FIG. 8 is similar to the signaling between the components of FIGS. 6 and 7. The signaling is described in greater detail with reference to FIGS. 10, 12A, 12B, and 12C.

Figure 9:
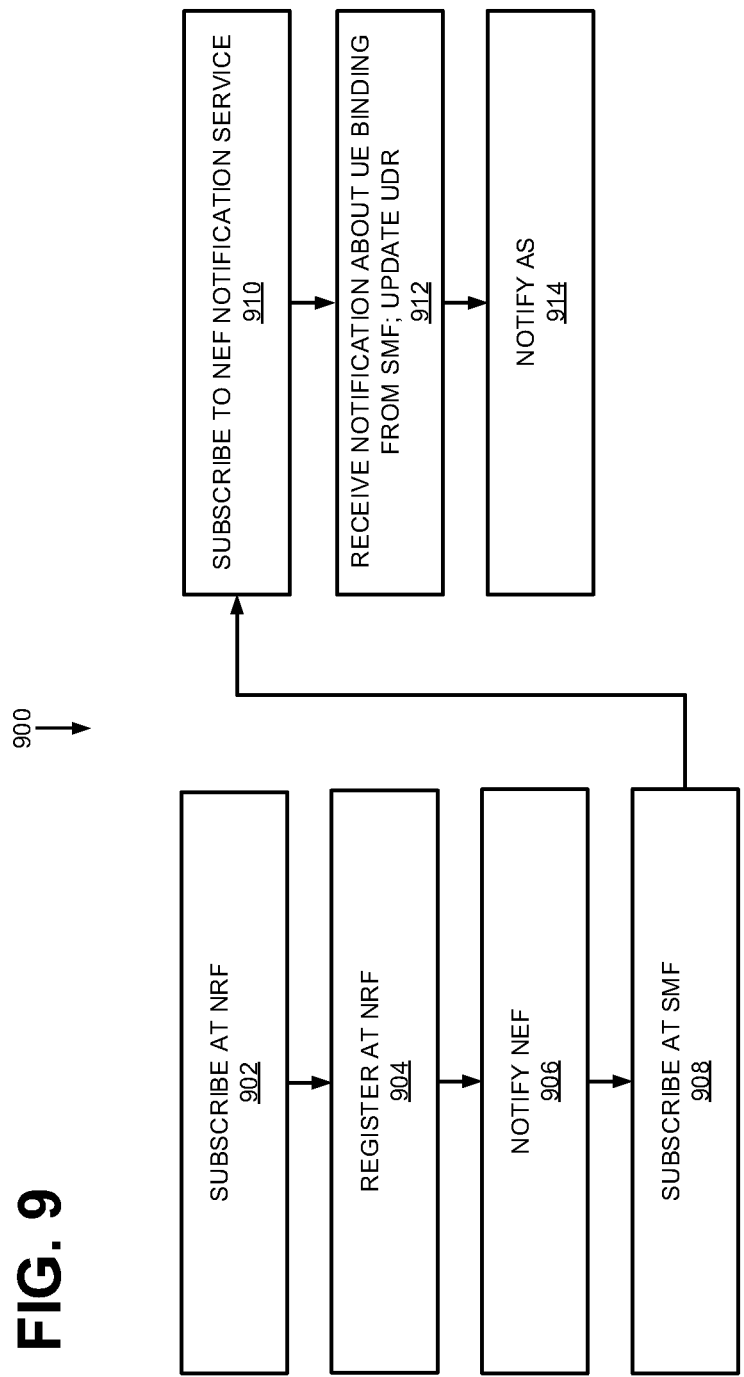
FIG. 9 is a flow diagram for a process that is associated with notifying an Application System (AS) about a UE identity according to an embodiment.
Figure 10:
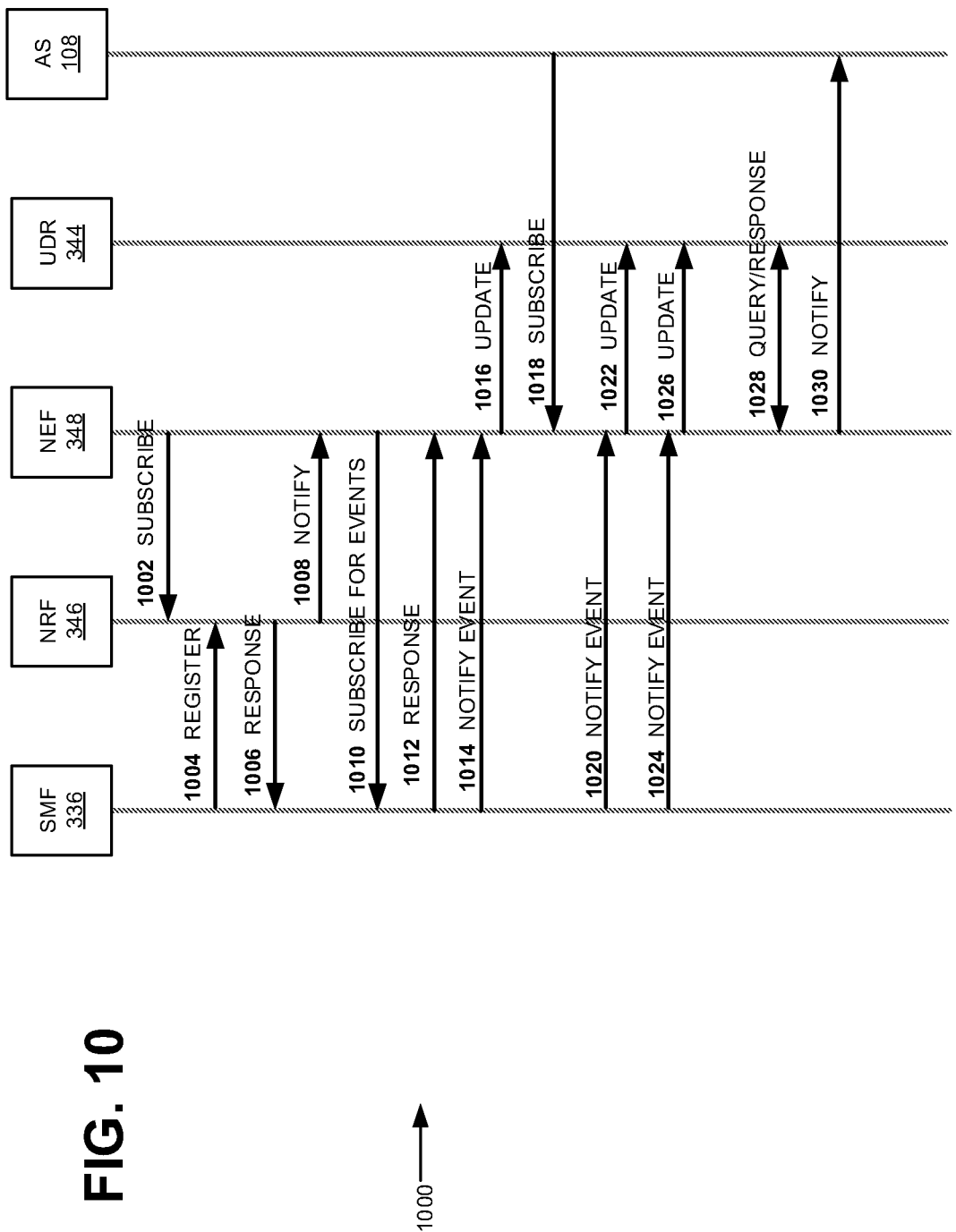
FIG. 10 illustrates signal flows, between components associated with notifying an AS about a UE ID according to an embodiment.

FIG. 9 is a flow diagram for a process 900 that is associated with the signaling among the components of FIG. 8. FIG. 10 illustrates the signaling. Process 900 and the signals of FIG. 10 cover part of the overall process and signals for exposing UE identities to AS 108. In particular, process 900 and the signals of FIG. 10 are performed to configure the components of FIG. 8. The configured components are capable of exposing UE identities to AS 108 when UE 102 establishes a session with AS 108. In FIGS. 9 and 10, each block and signal shown may represent multiple actions, signals, API calls, and/or messages. Furthermore, FIGS. 9 and 10 may not show all actions and/or signals during the process described. For the following, assume that NEF 348 is registered with NRF 346.

As shown, process 900 includes NEF 348 subscribing to the notification service offered by NRF 346 (block 902; signal 1002). By subscribing at NRF 346, NEF 348 will receive a notification from NRF 346 when SMF 336 registers at NRF 346.

Process 900 may further include SMF 336 registering with NRF 346, by sending a registration request to NRF 346 (signal 1004) and receiving a response (block 904; signal 1006). Because NEF 348 has subscribed to NRF 346 notification service, NRF 346 notifies NEF 348 in response to SMF 336 registration (block 906; signal 1008). When NEF 348 receives the notification from NRF 346, NEF 348 becomes aware of SMF 336, and therefore can subscribe to SMF 336's notification service.

Process 900 further includes NEF 348 subscribing to SMF 336 (block 908; signals 1010 and 1012). The subscription entails an exchange of a request 1010 and a response 1012 between SMF 336 and NEF 348. Once NEF 348 is subscribed, SMF 336 will inform NEF 348 when SMF 336 detects a new binding between a UE ID and IP addresses.

In some implementations, NEF 348 and SMF 336 may support the use of a new SMF interface for a bulk subscription. The interface may permit NEF 348 to specify the following: RAT; UE Location; UPF ID (NID—configurable for MEC topology mapping); UE IPv4 address; NAT IPv4 address; Port Chunk (starting port and range); CLLI; and User Plane (UP) path change. In response to the interface call, SMF 336 may send a notification when an event corresponding to a change to the following occurs: the UE IP address/Prefix, IPv4 address, NAT IPv4 address, Port Chunk (starting port range), and/or DNAI and/or the N6 traffic routing information. The notification from SMF 336 may include the following: the type of notification ("EARLY" or "LATE"); for both the source and target UP path between the UE and the data network, the corresponding information that has changed; DNAI; External ID; UE IP address/Prefix; UE IPv4 address; IPv4 NAT address; port chunk (starting port and range); Serving Gateway Information (FQDN and CLLI).

For an example of signaling that involves the interface, assume that SMF 336 initiates/detects a session creation at a UPF 338. SMF 336 notifies NEF 348 of the event (signal 1014). The notification includes the IP address of the UE 102, the NAT IP address, port chunk start, port chunk size, DNAI, UE IDs (e.g., MSISDN, IMSI, External ID, etc.), etc. When NEF 348 receives the notification, NEF 348 records the information provided in the notification at UDR 348 (signal 1016).

For the remainder of process 900, assume that AS 108 wants to be notified of any binding between UE IDs and the IP addresses. Process 900 may further include AS 108 (or AF 340) subscribing to NEF 348 (block 910; signal 1018). Assume that, after AS 108 subscribes for notifications at NEF 348, SMF 336 detects various events and notifies NEF 348 (signals 1020 and 1024). In response, NEF 348 updates UDR 344 (signals 1022 and 1026). Assume that SMF 336 notifies NEF 348 of another event (block 912) and NEF 348 updates UDR 344 (block 912). If the event which SMF 336 notifies through signal 1024 is the type of event for which AS 108 subscribed through signal 1018 (i.e., UE 102 binding to IP addresses), then NEF 348 queries UDR 344 for additional information (signal 1028) and then notifies AS 108 of the binding (block 914; signal 1030). Thereafter, AS 108 may use the identity of UE 108 to render its services.

As noted above, FIGS. 9 and 10 do not illustrate all blocks and signals that may occur during process 900. In particular, FIGS. 9 and 10 do not show all blocks and signals after AS 108 subscribes to NEF 348. SMF 336 may receive signals from UE 102 to establish a session, and many signals/blocks may occur before and after NEF 348 notifies AS 108 about the binding between UE ID and IP addresses that may be made as a result of the session establishment. Examples of such additional blocks and signals are illustrated in FIGS. 11, 12A, 12B, and 12C.

Figure 11:
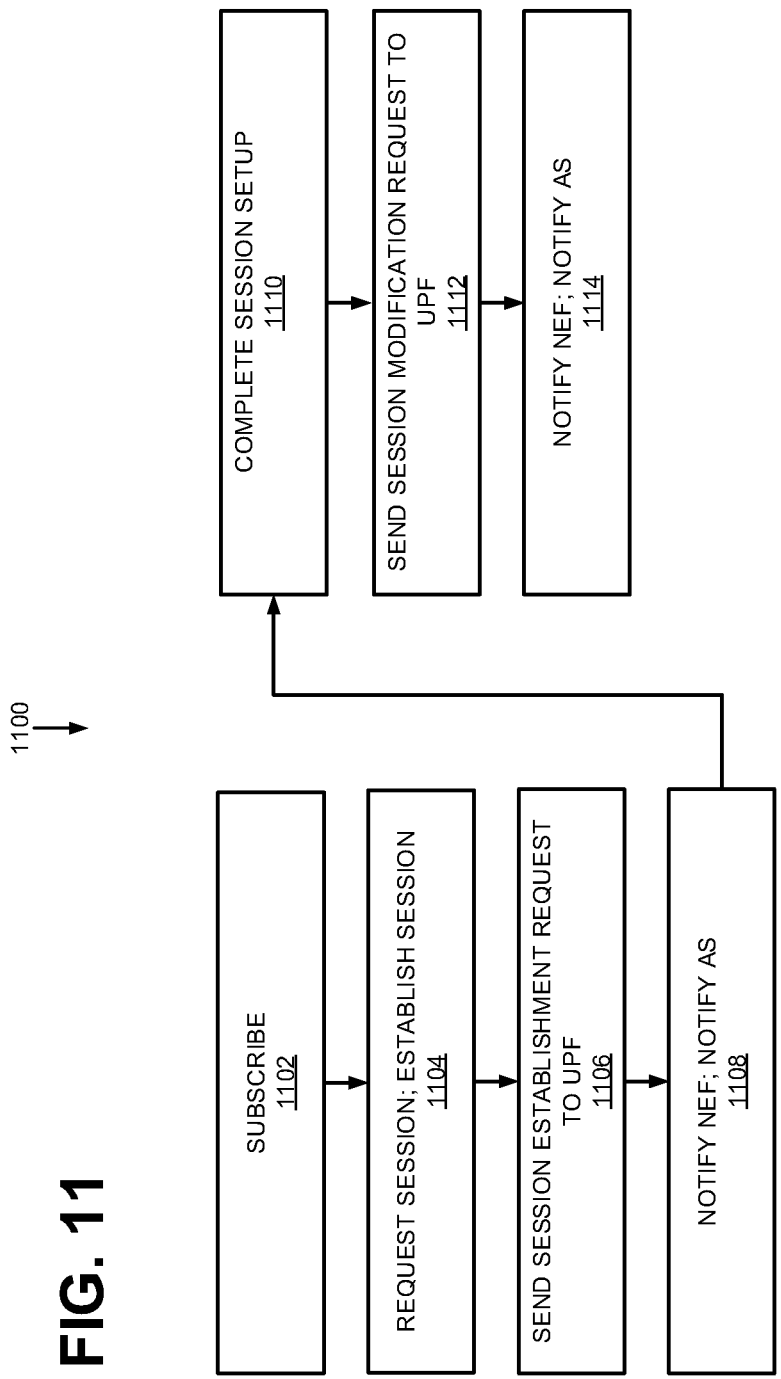
FIG. 11 is a flow diagram for a process in which a Network Exposure Function (NEF) notifies an AS about a UE ID according to an embodiment.
Figure 12A:
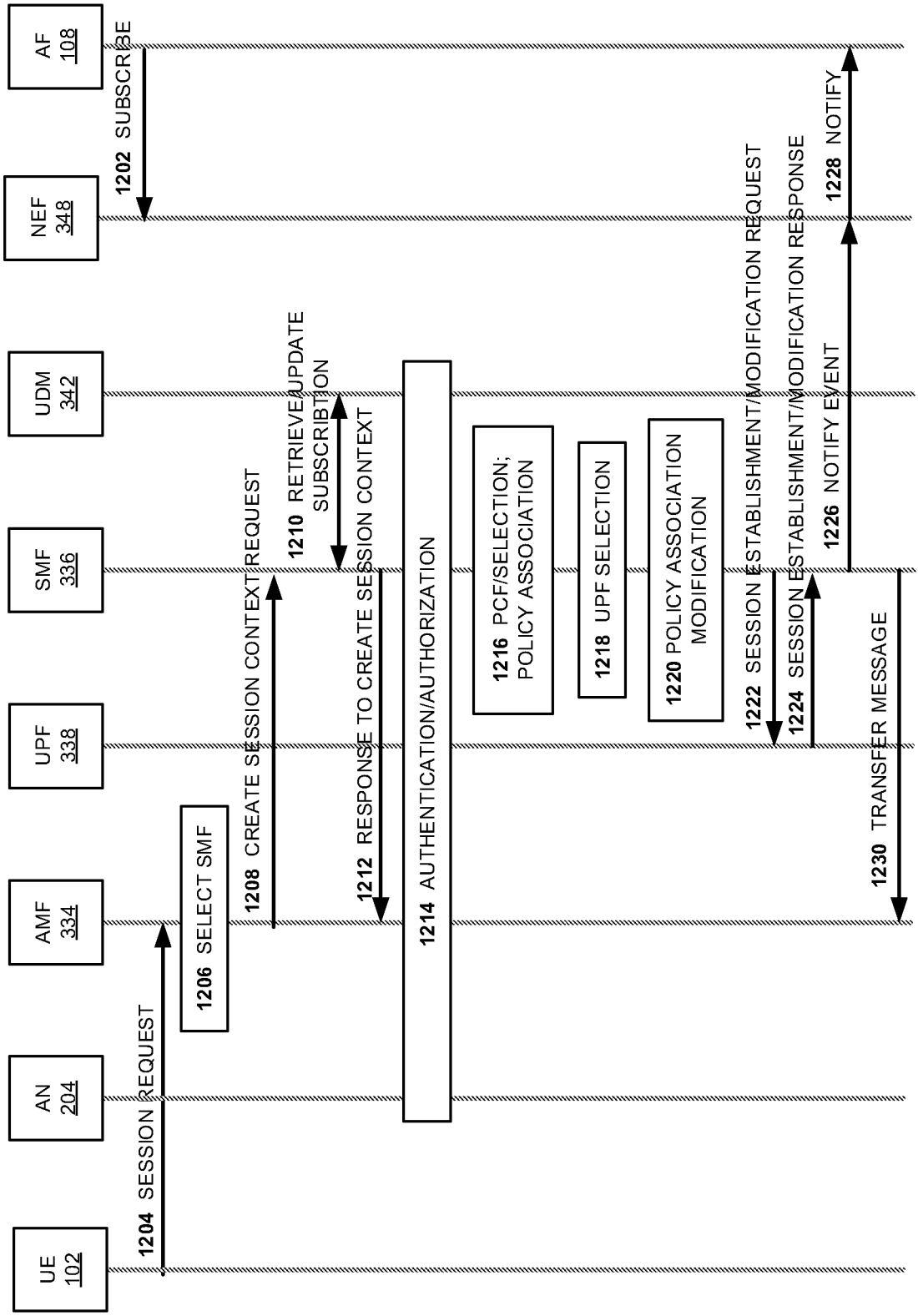
FIGS. 12A-12C illustrate signal flows between components associated with notifying the AS about the UE ID according to an embodiment.
Figure 12B:
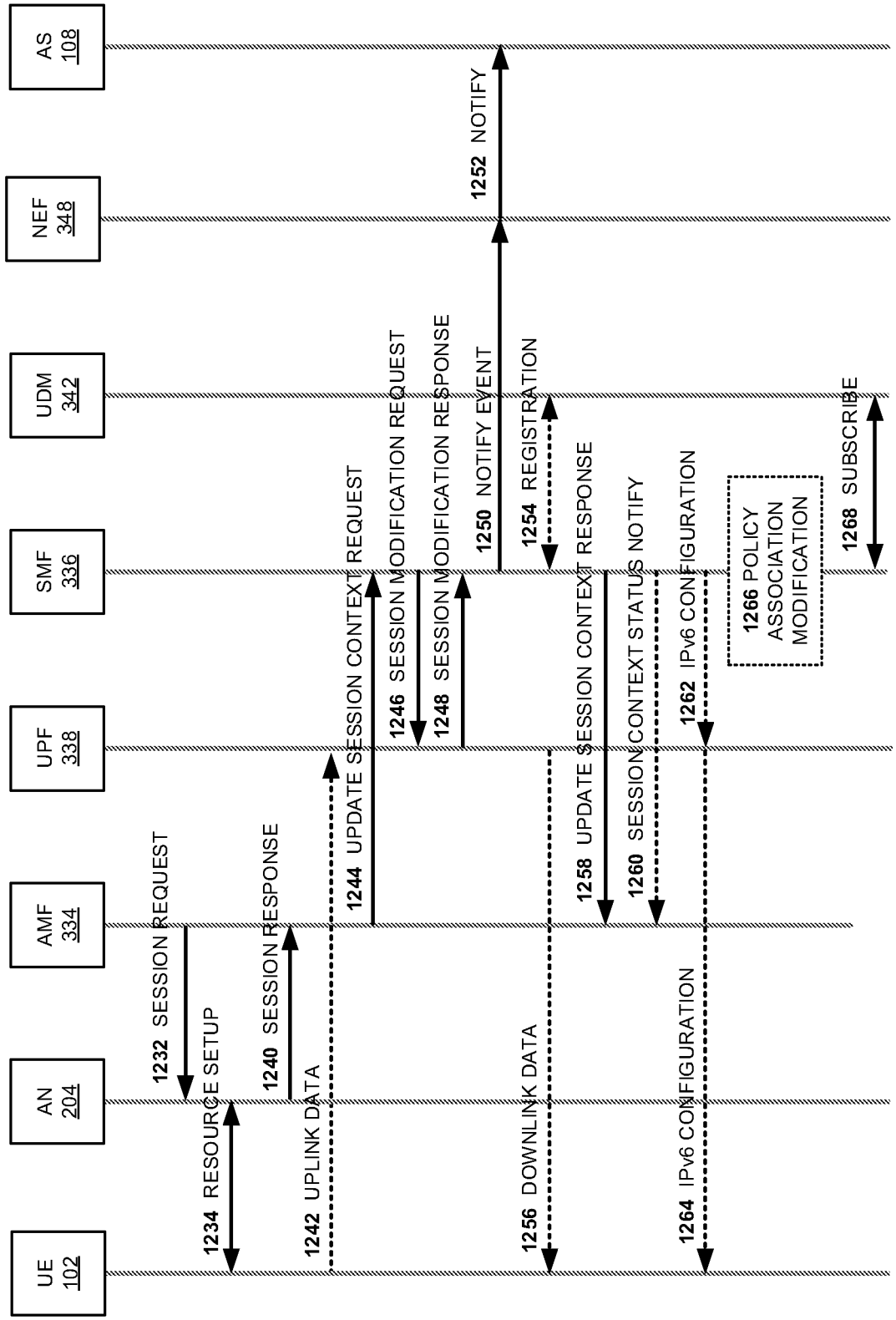

FIG. 11 is a flow diagram for a process 1100 in which NEF 348 notifies AS 108 about a binding between a UE ID and IP addresses as a result of session establishment. FIGS. 12A and 12B illustrate signal flows, between the components of FIG. 8, associated with notifying AS 108 about the binding. For process 1100, assume that NEF 348 has already subscribed to SMF 336's service to be notified of a binding between UE ID and IP addresses.

As shown, process 1100 may include AS 108 subscribing to NEF 348 (block 1102; signal 1202). Later, UE 102 may request AMF 334 to establish a session (block 1104; signal 1204). In response, the components of the network may perform various actions to establish the session (block 1104). As illustrated in FIG. 12A, some of these actions include the following: selecting SMF 336 by AMF 334 (block 1206); AMF 334 sending a create session context request to SMF 336 (signal 1208); SMF 336 retrieving and/or updating subscription information related to UE 102 from/at UDM 342; (signal 1210); SMF 336 responding to AMF 334's earlier request to create a session context (signal 1212); AMF 334, SMF 336, UDM 342, and/or other components performing authentication for UE 102 (box 1214); SMF 336 selecting a PCF and associating policies to UE 102 (block 1216); SMF 336 selecting a UPF 338 (block 1218); and SMF 336 performing policy association modification (block 1220).

Process 1100 may further include SMF 336 sending a request for a session establishment to UPF 338 (block 1106; signal 1222). Once UPF 338 establishes the session, UPF 338 may notify SMF 336 (signal 1224). During its interaction with UPF 338, SMF 336 may obtain the binding information between the UE ID and IP addresses, such as the IP address assigned to UE 102 and/or Network Address Translated (NAT) address, a port chunk size, a port chunk start, DNAI, UE ID (e.g., MSISDN, External ID, IMSI, etc.) etc. Thereafter, SMF 336 may send an event notification message to NEF 348 (block 1108; signal 1226). NEF 348 may then notify AS 108 (block 1108; signal 1228). Through the notifications, NEF 348 may relay the binding information for the UE ID and IP address to AS 108. As explained with reference to FIGS. 9 and 10, generating these signals may involve interaction with other network functions, such as UDR 344. For simplicity, such interactions are not illustrated in FIG. 12A. SMF 336 may exchange with AMF 334 transfer communication messages (signal 1230).

Process 1100 may further include completion of the session setup (block 1110). FIG. 12B shows several signals involved in completing the session setup. The signaling includes AMF 334 sending a PDU session request to access network (AN) 204, which then negotiates further PDU session setup with UE 102 (signals 1232 and 1234). Upon completion of the setup, AN 204 responds to AMF 334 with a session response (signal 1240). At that point, UE may forward its uplink data (signal 1242). The data, for example, may be forwarded to AS 108, although not shown in FIG. 12B.

After the session establishment setup is complete, AMF 336 may send one or more update session context requests to SMF 338 (signal 1244). SMF 336 may respond to each request by sending a session modification request to UPF 338 (block 1112; signal 1246). After making the request modification, UPF 338 may send a session modification reply to SMF 336 (signal 1248). During the session modification, UPF 338 may make necessary changes to the UE ID binding, which may alter UE IP address, NAT address, port chunk size, etc. If such changes are made such information is conveyed to SMF 336, and SMF 336 may notify NEF 348 with the updated UE ID binding information (block 1114; signal 1250). NEF 348 may then relay the information to AS 108 (block 1114; signal 1252). SMF 336 may register the changes at UDM 342 (signal 1254). Once the session has been updated, UPF 338 may send the downlink data (signal 1256) received from, for example, AS 108 (signal not shown). SMF 336 may provide a response to the update session context request (signal 1258). Thereafter, SMF 336 may send notifications of the session context status to AMF 334 (signal 1260).

Depending on the situation, process 1100 may include additional actions. For example, SMF 336 may signal UPF 338 to configure IPv6 (signal 1262 and 1264); SMF 336 may initiate a policy association modification (block 1266); and/or SMF 336 may unsubscribe, at UDM 342, UE 102 (signal 1268). Furthermore, before the binding information is sent from NEF 348 to AS 108, NEF 348 may update UDR 344.

Figure 12C:
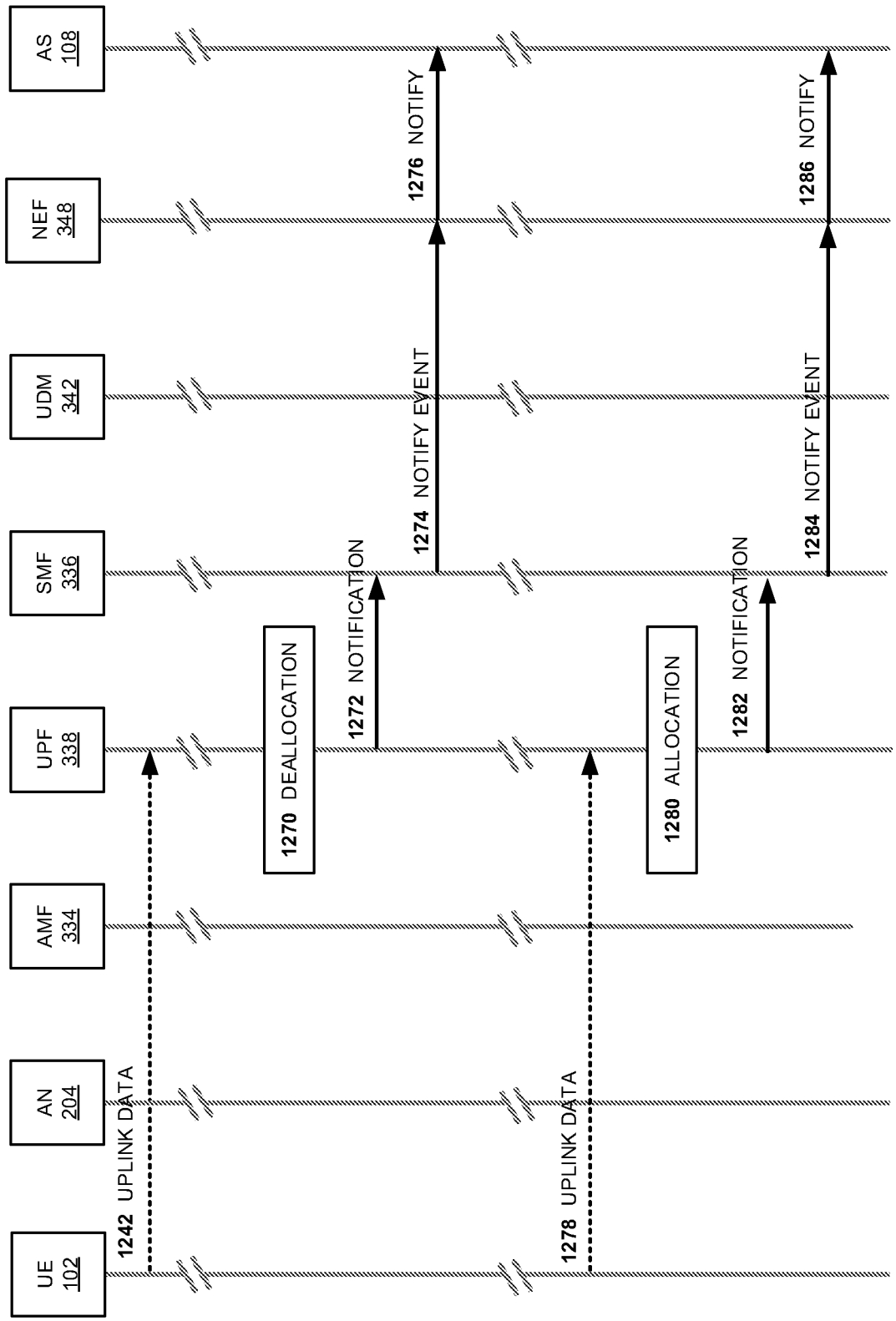

FIG. 12C illustrates signal flows, between the components of FIG. 8, associated with notifying AS 108 about the binding. More specifically, FIG. 12C illustrates signal flow between the components of FIG. 8 when UPF 338 deallocates NAT address. Assume that after signal 1242, UE 102 does not send uplink data for a period of time. As a consequence of the inactivity during the session, UPF 338 may initiate on its own (without input from SMF 336) deallocation of the NAT address (block 1270) and notify SMF 336 about the modified UE binding, such as the deallocated NAT address, port chunk size, UE ID, etc. (signal 1272). SMF 336 may notify NEF 348 with the updated UE ID binding information (signal 1274), and NEF 348 may then relay the information to AS 108 (block 1114; signal 1276).

If a period of time elapses after the deallocation and UE 102 becomes active and sends data (signal 1278), UPF 338 may need to "walk back" the deallocation, however. To do so, UPF 338 allocates a NAT address for the session and makes appropriate modifications to the UE ID binding (block 1280). UPF 338 may notify SMF 336 about the updated UE ID binding information (signal 1282), and SMF 336 may notify NEF 348 with the updated UE ID binding information (signal 1284). NEF 348 may then relay the information to AS 108 (signal 1286).

In the embodiments described with reference to FIGS. 12A-12C, it is the UPF 338 that allocates or deallocates a NAT address and makes appropriate modifications to the UE binding. In other embodiments, instead of having UPF 338 allocate or deallocate the NAT address, SMF 336 may allocate or deallocate a NAT address for a session. In such cases, SMF 336 may pass the allocated or deallocated NAT address to UPF 338 either in its signal for session creation/modification (e.g., signal 1222 and/or 1246) or in a response to a notification from UPF 338 about IP flows in a session (signal not shown). When UPF 338 receives a message indicating allocated/deallocated NAT address from SMF 336, UPF 338 may create/modify its UE ID bindings for the session, and update its own table of NAT addresses for UE IDs. Subsequently, UPF 338 may send a reply to SMF 336, to indicate the changes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of processes have been described above regarding blocks illustrated in FIGS. 9 and 11 and the signals in FIGS. 10, 12A, 12B, and 12C, the order of the processing and signaling may be modified in other implementations. In addition, non-dependent processing may be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A system comprising one or more processors that implement a Network Exposure Function (NEF) and a Session Management Function (SMF) in the system, wherein the one or more processors are configured to:

receive, by the SMF and from the NEF, a first request to subscribe to a notification service offered by the SMF;

send, by the SMF, a create session request to a User Plane Function (UPF);

receive, by the SMF, a first response from the UPF to the create session request, wherein the first response includes binding information associated with a User Equipment (UE) device;

send, by the SMF, as part of the notification service, a message that includes the binding information to the NEF; and send, by the NEF, the binding information to an application system, wherein the binding information includes a UE identifier (ID) for the UE device, one or more Internet Protocol (IP) addresses of the UE device, and a Network Address Translated IP address for the UE device.

2. The system of claim 1, wherein the NEF is configured to:

receive a second request from the application system to provide the UE ID; and send a message that includes at least the UE ID to the application system.

3. The system of claim 1, wherein the application system includes:

an application or an Application Function installed on a Multi-Access Edge Computing cluster.

4. The system of claim 1, wherein the binding information includes one or more of:

a Mobile Station International Subscriber Directory Number (MSISDN);

an External Identifier (ID);

a Data Network Access Identifier (DNAI); or an International Mobile Subscriber Identity (IMSI).

5. The system of claim 1, wherein the SMF is configured to:

receive, from an Access and Mobility Function (AMF), a request to establish a session for the UE device.

6. The system of claim 1, wherein the NEF is configured to:

subscribe to a notification service provided at a Network Repository Function (NRF), and wherein the NRF is configured to:

notify the NEF when the SMF registers with the NRF.

7. The system of claim 1, wherein the NEF is configured to:

when the NEF receives the message, update a user profile at a Unified Data Repository (UDR).

8. The system of claim 1, wherein the UPF is configured to:

in response to receiving the create session request, establish a tunnel between the UPF and the application system.

9. The system of claim 1, wherein the SMF is configured to:

receive, from an Access and Mobility Function (AMF), a request to update an existing session for the UE device.

10. A method comprising:

receiving, at a Session Management Function (SMF), from a Network Exposure Function (NEF), a first request to subscribe to a notification service offered by the SMF;

sending, from the SMF, a create session request to a User Plane Function (UPF);

receiving, at the SMF, a first response from the UPF to the create session request, wherein the first response includes binding information associated with a User Equipment (UE) device;

sending from the SMF, as part of the notification service, a message that includes the binding information to the NEF; and sending, by the NEF, the binding information to an application system, wherein the binding information includes a UE identifier (ID) for the UE device, one or more Internet Protocol (IP) addresses of the UE device, and a Network Address Translated IP address for the UE device.

11. The method of claim 10, further comprising:

receiving, at the NEF, a second request from the application system to provide the UE ID; and sending, from the NEF, a message that includes at least the UE ID to the application system.

12. The method of claim 10 wherein the application system includes:

an application or an Application Function installed on a Multi-Access Edge Computing cluster.

13. The method of claim 10, wherein the binding information includes one or more of:

a Mobile Station International Subscriber Directory Number (MSISDN);

a Data Network Access Identifier (DNAI); or an International Mobile Subscriber Identity (IMSI).

14. The method of claim 10, further comprising:

receiving at the SMF, from an Access and Mobility Function (AMF), a request to establish a session for the UE device.

15. The method of claim 10, further comprising:

subscribing by the NEF to a notification service provided at a Network Repository Function (NRF), and notifying by the NRF the NEF when the SMF registers with the NRF.

16. A non-transitory computer-readable medium comprising processor-executable instructions, that when executed by one or more processors, cause the one or more processors to implement a Network Exposure Function (NEF) and a Session Management Function (SMF), wherein the NEF and the SMF are configured to:

receive, by the SMF and from the NEF, a first request to subscribe to a notification service offered by the SMF;

send, by the SMF, a create session request to a User Plane Function (UPF);

receive, by the SMF, a first response from the UPF to the create session request, wherein the first response includes binding information associated with a User Equipment (UE) device;

send, by the SMF, as part of the notification service, a message that includes the binding information to the NEF; and send, by the NEF, the binding information to an application system, wherein the binding information includes a UE identifier (ID) for the UE device, one or more Internet Protocol (IP) addresses of the UE device, and a Network Address Translated IP address for the UE device.

17. The non-transitory computer-readable medium of claim 16, wherein the NEF is configured to:

receive a second request from the application system to provide the UE ID; and send a message that includes at least the UE ID to the application system.

18. The non-transitory computer-readable medium of claim 16, wherein the application system includes:

an application or an Application Function installed on a Multi-Access Edge Computing cluster.

19. The non-transitory computer-readable medium of claim 16, wherein the binding information includes one or more of:

a Mobile Station International Subscriber Directory Number (MSISDN);
an External Identifier (ID);
a Data Network Access Identifier (DNAI); or
an International Mobile Subscriber Identity (IMSI).

20. The non-transitory computer-readable medium of claim 16, wherein the SMF is configured to:
receive, from an Access and Mobility Function (AMF), a request to establish a session for the UE device.

* * * * *